US010727574B2

(12) United States Patent
Lewis et al.

(10) Patent No.: US 10,727,574 B2
(45) Date of Patent: Jul. 28, 2020

(54) ACCESSIBLE RADOME ASSEMBLY

(71) Applicant: The NORDAM Group, Inc., Tulsa, OK (US)

(72) Inventors: David J Lewis, Broken Arrow, OK (US); Jeffrey Curtis Brown, Oologah, OK (US); Tony Curtis Hambrick, Broken Arrow, OK (US); James Robert Roderick, Tulsa, OK (US)

(73) Assignee: The NORDAM Group LLC, Tulsa, OK (US)

( * ) Notice: Subject to any disclaimer, the term of this patent is extended or adjusted under 35 U.S.C. 154(b) by 150 days.

(21) Appl. No.: 15/996,578

(22) Filed: Jun. 4, 2018

(65) Prior Publication Data

US 2018/0351243 A1 Dec. 6, 2018

Related U.S. Application Data

(60) Provisional application No. 62/515,007, filed on Jun. 5, 2017.

(51) Int. Cl.
| | | |
|---|---|---|
| *H01Q 1/42* | (2006.01) | |
| *H01Q 1/28* | (2006.01) | |
| *B64C 1/36* | (2006.01) | |
| *B64C 1/14* | (2006.01) | |
| *H01Q 3/04* | (2006.01) | |

(52) U.S. Cl.
CPC ............. *H01Q 1/42* (2013.01); *B64C 1/1446* (2013.01); *B64C 1/36* (2013.01); *H01Q 1/28* (2013.01); *H01Q 1/282* (2013.01); *H01Q 3/04* (2013.01)

(58) Field of Classification Search
CPC ...................................... H01Q 1/42; H01Q 1/282; H01Q 1/28; H01Q 3/04; B64C 1/1446; B64C 1/36
See application file for complete search history.

(56) References Cited

U.S. PATENT DOCUMENTS

| | | | | |
|---|---|---|---|---|
| 2,943,756 | A | * | 7/1960 | White ...................... B64C 1/36 |
| | | | | 217/60 C |
| 2,982,494 | A | | 5/1961 | Amason |
| 4,593,288 | A | | 6/1986 | Fitzpatrick |
| 5,820,077 | A | | 10/1998 | Sutliff et al. |
| 5,969,686 | A | | 10/1999 | Mackenzie |
| 6,126,114 | A | | 10/2000 | Victor |

(Continued)

OTHER PUBLICATIONS stackoverflow.com, "How Does Will Work on an Aircraft?" 4 pages, May 19, 2015, Aviation.Stackexchange.com, New York, NY, US.

(Continued)

*Primary Examiner* — Dameon E Levi
*Assistant Examiner* — David E Lotter
(74) *Attorney, Agent, or Firm* — Francis L. Conte

(57) ABSTRACT

A radome assembly (20) includes a frame (30) conforming in contour with an aircraft fuselage (14) for being fixedly mounted thereto. A radome (32) having an aerodynamically streamlined elongate contour including a central bulb (34) is spaced from the frame (30) to house an antenna (26) therein, the radome (32) being tuned in configuration to define an unobstructed radio-frequency (RF) window (28) diverging outwardly from atop the frame (30). The radome (32) is pivotally mounted atop the frame (30) by a hinge (36,74,78) hidden inside the frame (30) below the RF window (28) when the radome (32) is stowed closed atop the frame (30) and antenna (26).

20 Claims, 12 Drawing Sheets

(56) References Cited

U.S. PATENT DOCUMENTS

| | | | |
|---|---|---|---|
| 7,503,523 | B2 | 3/2009 | Perez-Sanchez |
| 7,786,937 | B1 | 8/2010 | Stierhoff et al. |
| 2005/0116106 | A1 | 6/2005 | Perez-Sanchez |
| 2007/0045467 | A1 | 3/2007 | Jeanneau et al. |
| 2012/0086613 | A1 | 4/2012 | Lundeen |
| 2014/0111390 | A1 | 4/2014 | Carides et al. |
| 2015/0207214 | A1* | 7/2015 | Wallace .................. H01Q 1/42 |
| | | | 343/705 |
| 2016/0190679 | A1* | 6/2016 | Fournie .................. H01Q 1/281 |
| | | | 343/872 |
| 2017/0313402 | A1* | 11/2017 | Flores ...................... B64C 7/00 |

OTHER PUBLICATIONS

Steve Nichols, "Satcom Antennas—Leading-Edge Technology Hidden From View," 7 pages, Apr. 13, 2013, Getconnected.aero (& Inflight Magazine), United Kingdom.

Carlisle Companies Incorporated, "Carlisle Interconnect Technologies Receives FAA STC for ARINC 791 Antenna Provisions Installation on Airbus A320 Series Aircraft," 6 pages, Jan. 29, 2017, PRWEB.com, Franklin, Wisconsin, USA.

\* cited by examiner

ACCESSIBLE RADOME ASSEMBLY

BACKGROUND OF THE INVENTION

The present invention relates generally to aircraft, and, more specifically, to radome communication systems therein.

A typical aircraft includes various electrical and electronic systems, some of which require a suitable antenna for transmitting and/or receiving radio-frequency (RF) signals. One type of RF signal is used in radar detection of other flying aircraft.

Another type of RF signal can be used in cooperation with the Global Positioning System (GPS) for aircraft navigation.

And, another type of RF signal can be used for communications, and also supporting the In Flight Entertainment (IFE) system.

Accordingly, the aircraft requires one or more antennae to transmit and/or receive RF signals for the various purposes commonly found in modern aircraft. Such an antenna must be suitably mounted in the aircraft for externally transmitting and receiving the RF signals without RF obstruction or interference.

The antenna must also be protected from the environment, and therefore is typically mounted externally to the top of the aircraft under a protective radome composite shell enclosure. The radome, or suitable RF canopy, may have various compositions and forms for passing RF signals with minimal or no RF interference.

Traditionally radomes are attached to aircraft by adapter plates using a multitude of screws and nutplates in combination.

Accordingly, in the maintenance process to access the internal antenna and any associated electronic equipment (e.g. IFE system), the multitude of fasteners (typically 50-plus) must be removed and is therefore slow, cumbersome, difficult, and labor intensive.

Maintenance personnel experience difficulty in handling the radome and installing fasteners for radomes situated on top of the aircraft.

Support personnel consist of up to two or three men for accessing the WE system.

Large radomes are difficult to handle and position atop the aircraft. This work is not necessarily attempted in an enclosed hanger. If work is to be performed outside, adverse weather conditions can have a detrimental effect on working conditions for support personnel.

Some form of lift is required to raise support personnel on a platform to the top of the aircraft.

All support personnel must be tethered for safety concerns.

The maintenance process can create an environment for increased potential of foreign object damage (FOD).

Maintenance costs are increased for stocking different grip lengths of fasteners or screws required to be kept on hand by the service provider.

Cost is further increased for nutplates which can be easily damaged during installation and must be replaced if damaged.

Accordingly, it is desired to provide an improved radome assembly having easy access to internal equipment under the radome.

BRIEF DESCRIPTION OF THE INVENTION

A radome assembly includes a frame conforming in contour with an aircraft fuselage for being fixedly mounted thereto. A radome having an aerodynamically streamlined elongate contour including a central bulb is spaced from the frame to house an antenna therein, the radome being tuned in configuration to define an unobstructed radio-frequency (RF) window diverging outwardly from atop the frame. The radome is pivotally mounted atop the frame by a hinge hidden inside the frame below the RF window when the radome is stowed closed atop the frame and antenna.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
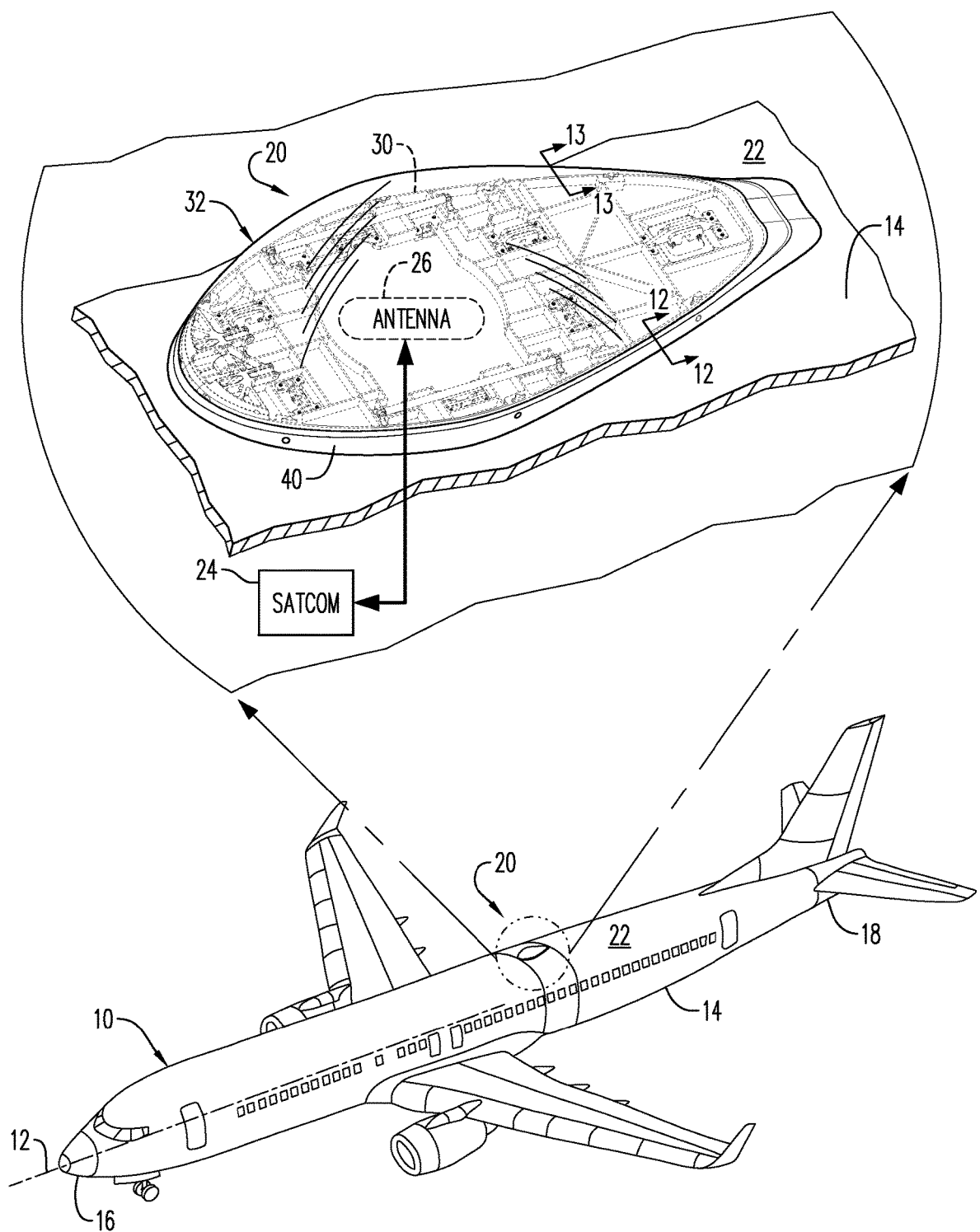
FIG. 1 is an exploded view of an exemplary accessible radome assembly mounted atop an aircraft, with a radome shown in phantom hinge-mounted atop a supporting frame.

Illustrated in FIG. 1 is an exemplary commercial aircraft 10 having a longitudinal or axial centerline axis 12. The aircraft 10 includes wings mounted to the generally cylindrical fuselage 14 and extends in length from the forward nose 16 to the aft tail 18.

The aircraft 10 is conventional in configuration and operation for typically flying commercial passengers seated in rows inside the fuselage 14, or cabin, and is powered by wing-mounted turbofan gas turbine engines.

The aircraft 10 is modified as disclosed hereinbelow to include a readily accessible radome assembly 20 fixedly mounted to the top of the fuselage 14 between the wings and tail 18, for example, in an aerodynamically smooth blending with the outer skin 22 of the fuselage.

Figure 2:
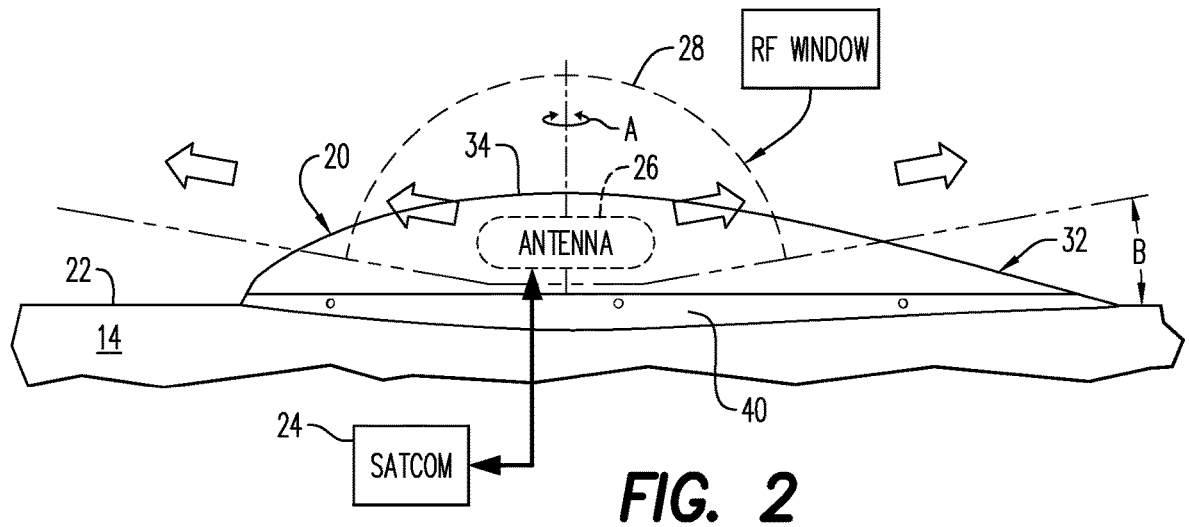
FIG. 2 is a side elevational view of the radome assembly shown in FIG. 1.
Figure 3:
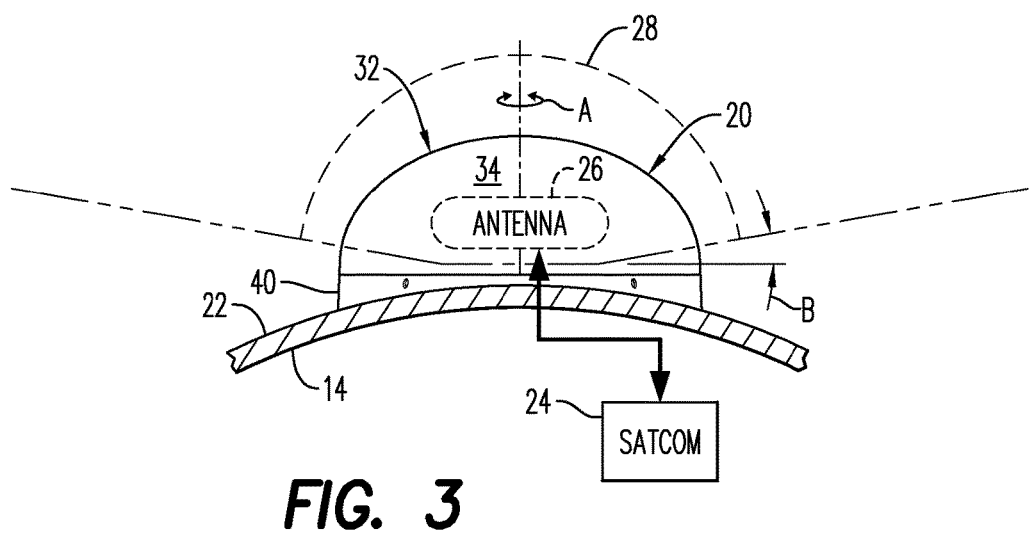
FIG. 3 is a front elevational view of the radome assembly shown in FIG. 1.
Figure 4:
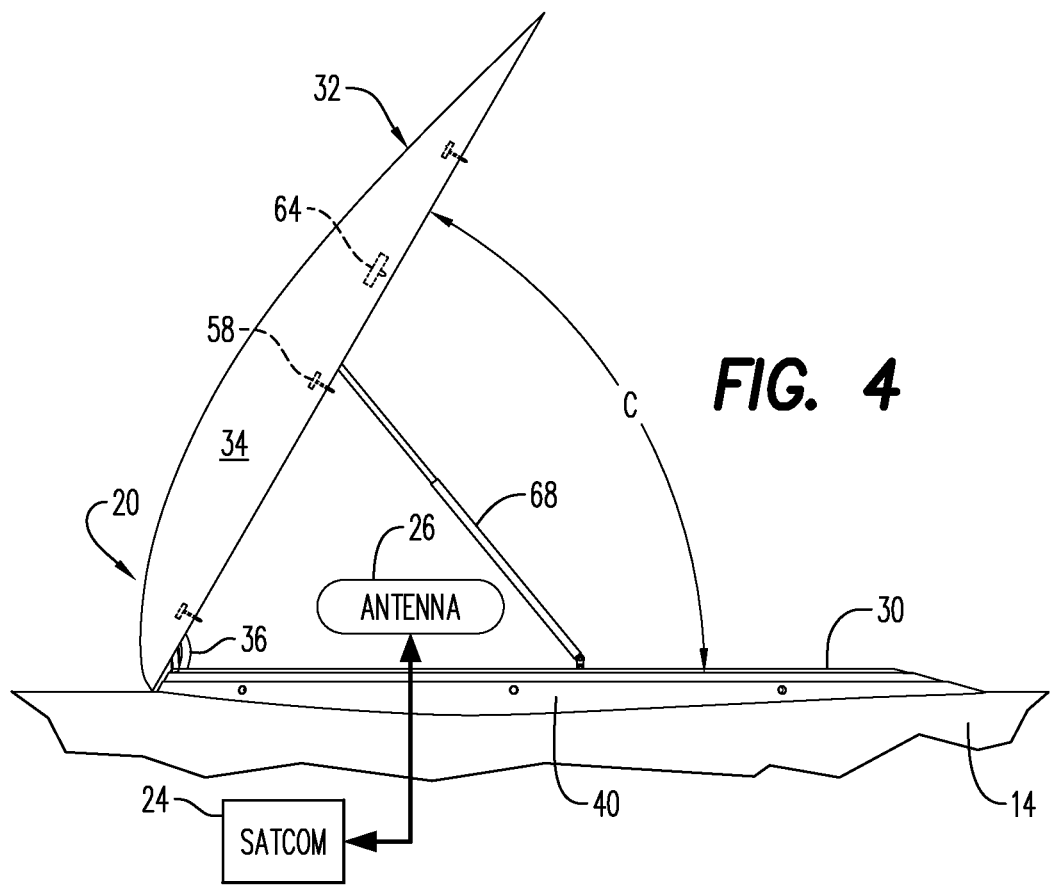
FIG. 4 is a side view of the radome in the deployed open position.
Figure 5:
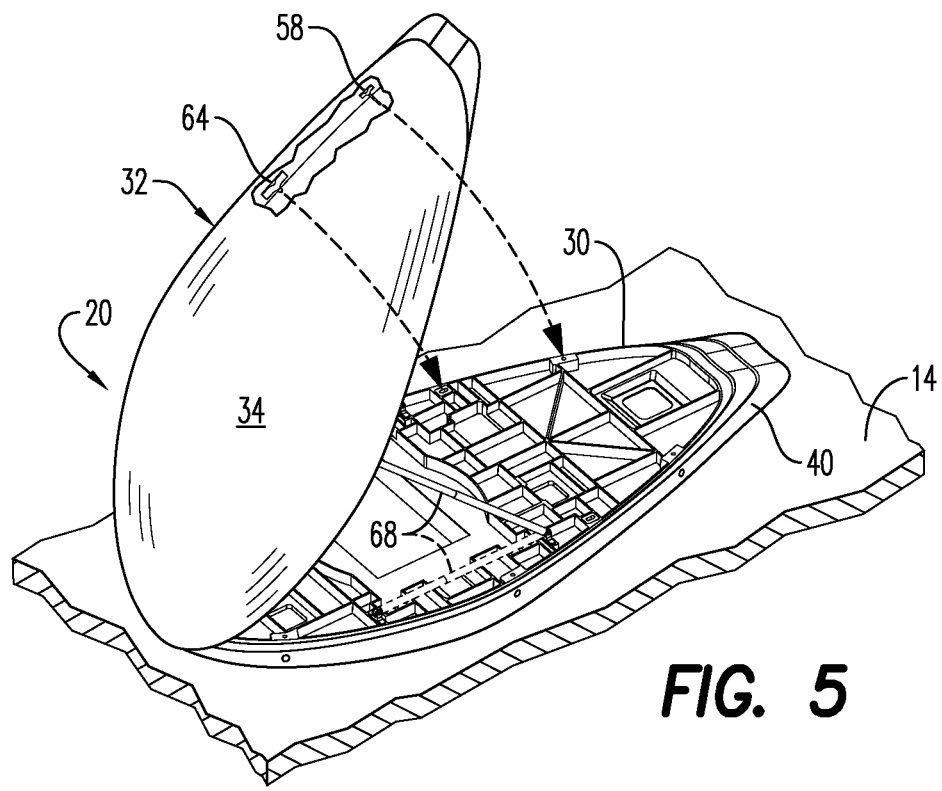
FIG. 5 is an isometric view of the radome shown in FIG. 4 in the deployed open position.
Figure 6:
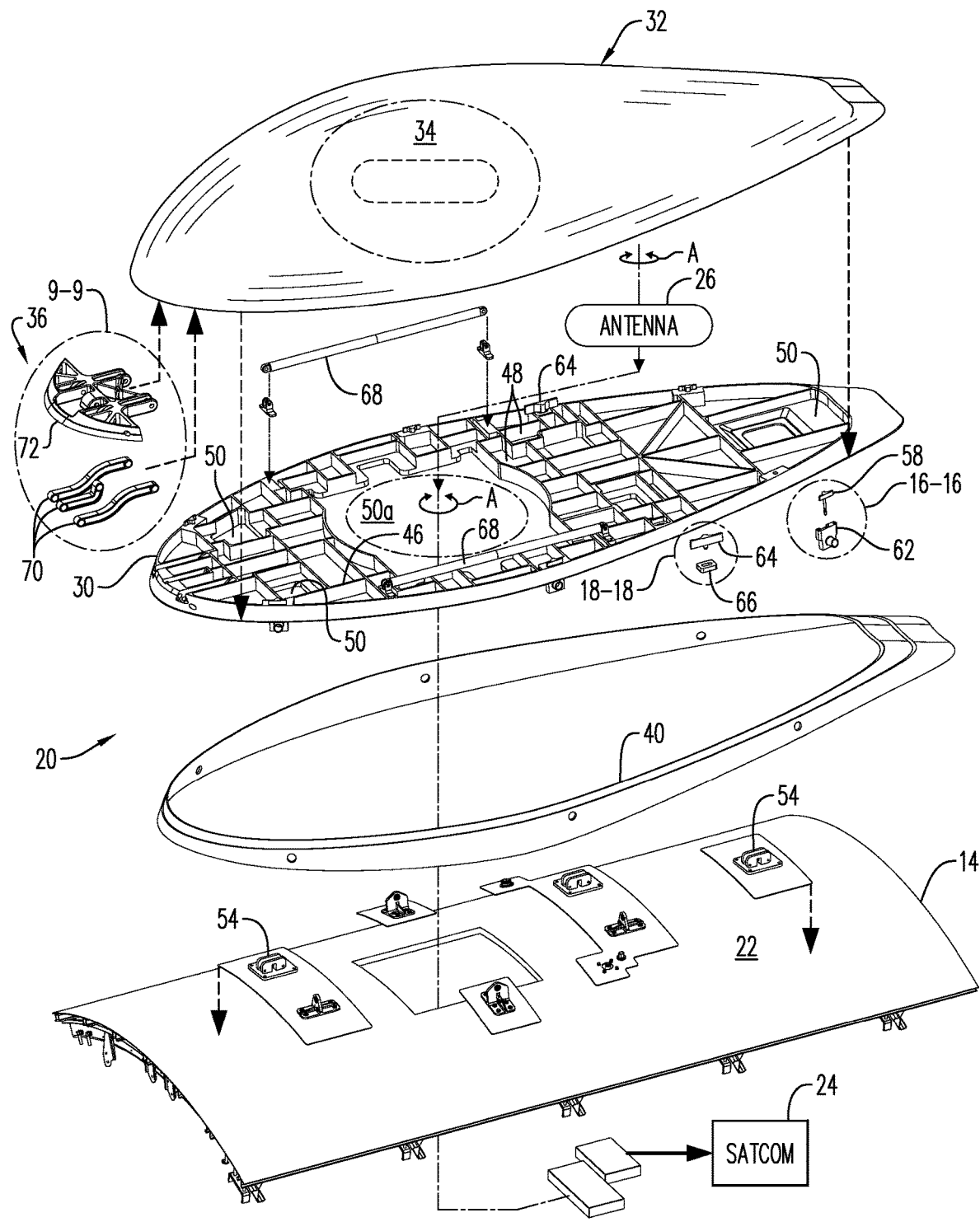
FIG. 6 is an exploded view of the radome assembly including a radome, frame, and skirt atop a corresponding portion of the aircraft.

The radome assembly 20 is shown in an exemplary embodiment additionally in FIGS. 2-6, with FIGS. 1-3 illustrating the stowed closed position thereof, FIGS. 4 and 5 illustrating the deployed open position thereof, and FIG. 6 illustrating an exploded view of main components thereof.

As initially shown in FIGS. 1-3, the aircraft 10 includes a Satellite Communication (Satcom) System 24 used herein generically for any and all types of electrical or electronic radio-frequency (RF) systems which receive or transmit, or both, RF signals for any conventional use in the aircraft.

The Satcom system 24 may include conventional radar for observing other flying aircraft; or may include navigational systems cooperating with the Global Positioning Satellite (GPS) system; or may include any type of communication system, all of which require an external antenna 26, or antennae, operatively joined to the Satcom system 24 for transmitting and/or receiving RF signals during aircraft operation.

The antenna 26 is shown schematically, and may have any conventional form. The antenna 26 is suitably mounted inside the radome assembly and is typically configured for rotation about a vertical rotary axis A as initially shown if FIGS. 2 and 3, and in this way has a laterally 360 degree field-of-view, or RF-signal window 28.

As initially shown in FIG. 6, the radome assembly 20 includes a lower supporting base plate or frame 30 conforming in three-dimensional (3D) shape or contour with the outward curvature or contour of the fuselage 14 for being fixedly mounted or attached outside thereto, and preferably atop the outer skin 22 thereof, without obstructing or interfering with the inside of the fuselage, typically reserved for other purposes.

An RF-transparent radome 32 in the typical form of a composite canopy or shell has an aerodynamically streamlined elongate contour that conforms in footprint or perimeter shape with the supporting frame 30. The radome 32 includes a central pocket or bulb 34 spaced outwardly or upwardly from the lower frame 30 to house or enclose the antenna 26 therein.

The frame 30 is suitably configured to hold the required antenna 26 and related equipment and forms a part of the structural system connecting the radome 32 to the cooperating structural fittings on the aircraft fuselage. The radome assembly 20 may be originally designed for new aircraft; or may be readily retro-fitted into existing or older aircraft.

The frame 30 allows for multiple aircraft structural attachment points that bolt securely from the bottom of the frame to the body or fuselage of the aircraft. The frame 30 can be extensively machined from billet of aluminum, or cast, to reduce the overall weight, while maintaining overall structural integrity and strength.

In the exemplary embodiment shown in FIGS. 1-3, the radome assembly 20, and enclosed antenna 26, is top-mounted to the aircraft fuselage 14, at the 12:00 O'clock position, and therefore the metal fuselage blocks the RF signals below the antenna.

The antenna 26 is suitably mounted in the frame 30, which frame can be cast or machined aluminum in turn attached to the fuselage 14, which is typically aluminum as well.

The metal frame 30 and underlying metal fuselage inherently block the RF signals below the antenna 26, and thus limit the antenna's effective field-of-view or RF window 28 with a lower limit threshold or minimum elevation from the top horizontal plane of the frame 30 as measured by the small acute angle B, of about 10 degrees for example, around the rotary range of the antenna.

In this configuration, the antenna 26 has an unobstructed RF window 28 of about 160 degrees vertically over its top and 360 degrees horizontally in the azimuth.

The Satcom antenna system may therefore track and maintain RF communications for all conventional purposes, including communications with overhead satellites to provide passengers with in-flight connectivity to networks; connecting the aircraft and its crew with ground-based operations, live TV, and Wi-Fi, and thereby enable devices for on-line internet services.

The substantial outward range of the RF window 28 permits an improved design of the radome assembly 20 for enclosing the RF antenna 26 and providing easy access thereto during maintenance operations.

The radome 32 itself may have any conventional design, and may include any combination of fiber reinforced composite prepregs and hexagonal honeycomb core, foam core, synthetic film or other materials designed for structural and electrical performance of specified requirements. The radome 32 functions as an aerodynamic fairing to protect the antenna 26 and any associated Satcom or IFE, equipment in required flight profiles and environments; and additionally functions as a tuning device to maximize electrical performance of the antenna 26 and associated RF equipment.

The radome 32 may be conventionally tuned in configuration in accordance with different aircraft applications and different locations along the fuselage. Tuning the radome configuration includes varying its shape, profile, and material composition. Material compositions may include various layups of quartz and fiberglass face sheets and foam cores or plies. Prepregs may be used to include reinforcement materials that have been pre-impregnated with either a thermoplastic or thermoset resin. The resin impregnation process precisely controls the fiber to resin ratio and ply thickness.

Thermoset prepregs are produced by saturating fiber reinforcement with a liquid thermoset resin. Excess resin is removed from the reinforcement and the resin undergoes a partial curing, changing from a liquid to a pliable solid state. The curing process is then activated with the application of heat.

Plies of prepregs materials may be laid-up in a tool by hand or with automated equipment. The laminate stack is then consolidated under the pressure of a vacuum bag. The curing process is triggered by the application heat in a heated tool, in an oven, or in an autoclave where heat and high pressure are applied. Thermoset prepregs require a controlled heat cycle for curing that allows for the appropriate resin flow within the laminate and then polymerization to the cured state. This typically involves a controlled heating rate and a soak time at specified temperature with controlled cool down.

Additional plies may be laminated to the inner surface of the radome shell to build up the thickness of the fiberglass skin to structurally support various fasteners as further described hereinbelow.

As initially shown in FIGS. 4 and 6, the radome 32 is pivotally mounted atop the frame 30 by a specifically configured hinge 36 hidden inside the frame 30 below the RF window 28 when the radome 32 is stowed closed atop the frame and antenna 26.

It is imperative that the antenna signal is not interfered with or degraded by any modifications made to the baseplate or frame 30. FIGS. 2 and 3 illustrate a worst case scenario with the antenna phase front position at the minimum elevation of about 10 degrees antenna look angle B. The angled lines represent the bottom edge at the 3 db beamwidth of the main RF signal beam providing a 10 degree separation from the frame 30 in elevation at any angle (360 degrees) in azimuth.

Figure 8:
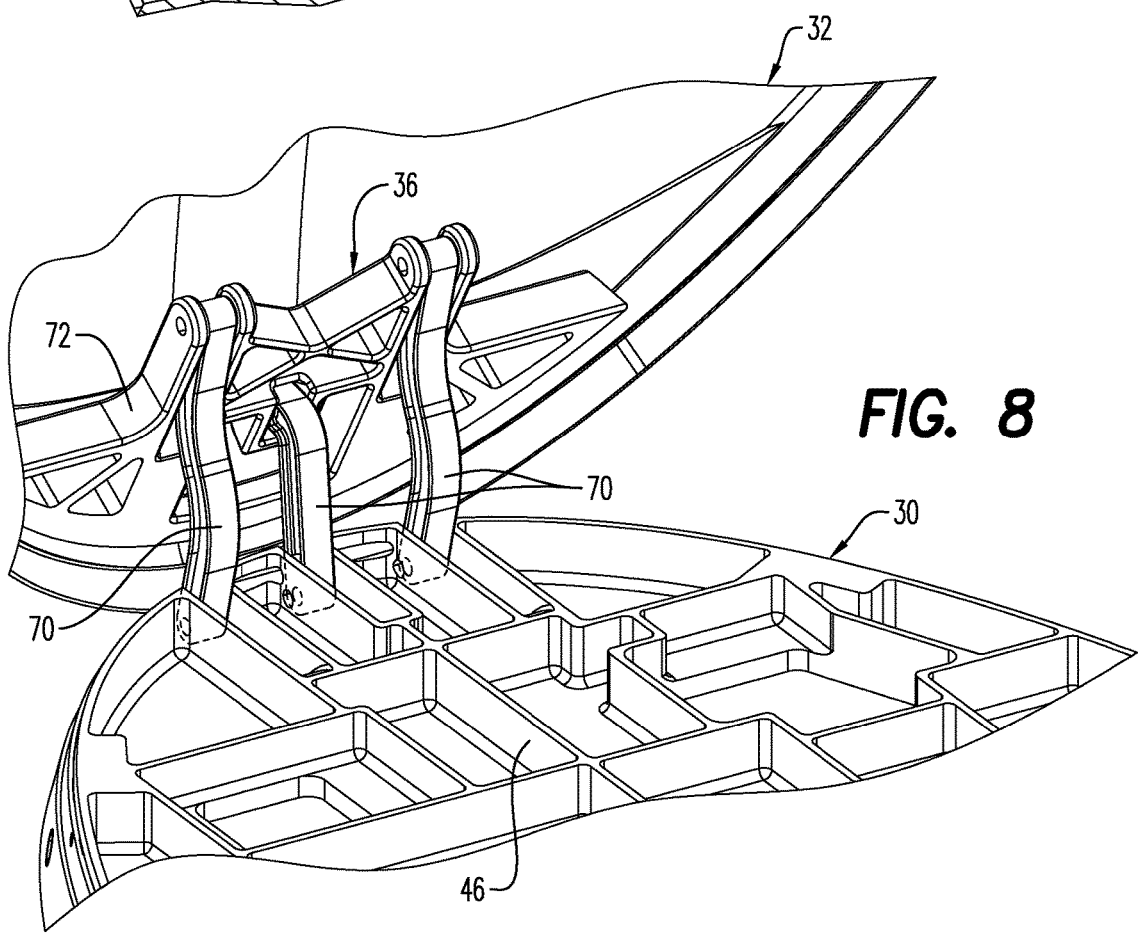
FIG. 8 is an isometric view of an exemplary front hinge for forward-mounting the radome to the frame shown in the exemplary embodiment shown in FIG. 6.

As shown in FIGS. 6 and 8, the exemplary forward-mounted radome hinge 36 can be preferentially configured and located for being mostly hidden inside the frame 30 with no interference or obstruction to the main RF signal beam of the antenna 26 whether the transmission path is in the upstream (to the satellite) or downstream (from the satellite) mode.

The aircraft fuselage 14 shown in FIG. 1 is generally cylindrical along its longitudinal axis 12 between the front nose 16 and the aft tail 18. Correspondingly, the frame 30 is preferably longitudinally elongate to conform longitudinally with the outer skin 22 of the fuselage 14 between the nose 16 and tail 18.

Figure 7:
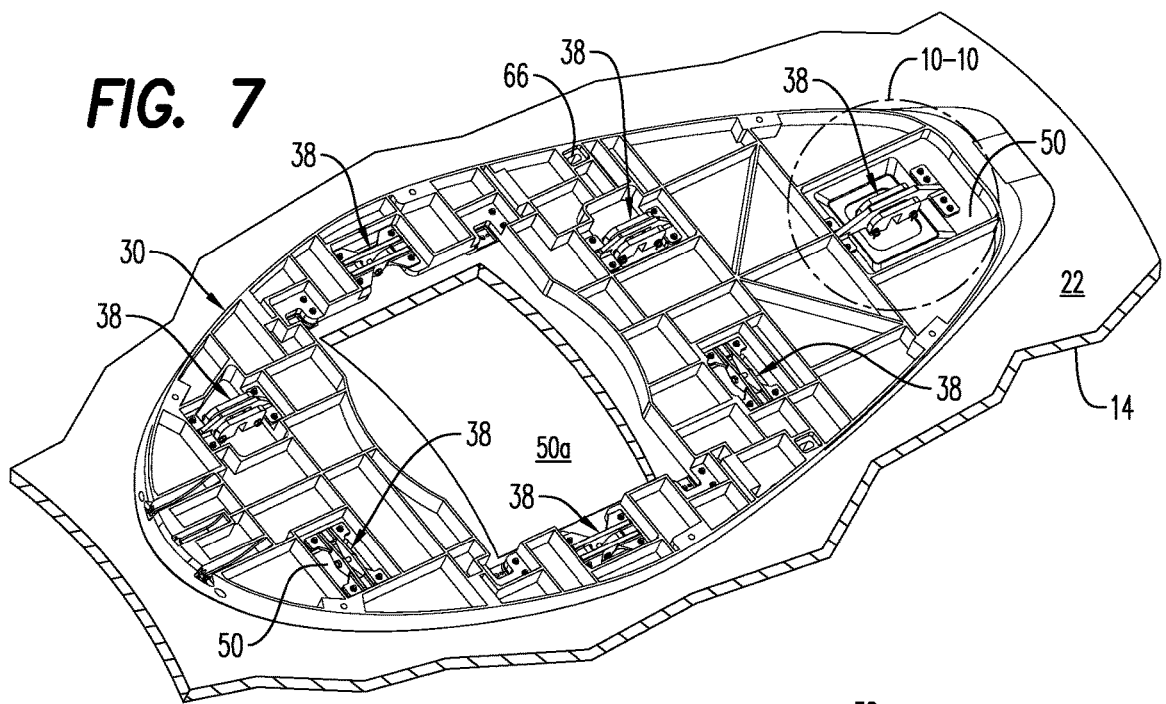
FIG. 7 is a top view of the frame shown in FIG. 6.

As initially shown in FIG. 7, the frame 30 includes a plurality of attachment fixtures or anchors 38 for fixedly attaching the frame 30 to the top or outer skin 22 of the fuselage 14 generally coextensive therewith for reducing drag losses therefrom.

The radome 32 is similarly longitudinally elongate and sized to house or enclose the antenna 26 atop the frame 30 to hide the hinge 36 below the RF window 28. The radome 32 is locally enlarged at the central bulb (34) portion thereof to house the bulky antenna 26, and is correspondingly streamlined in configuration to diverge from its front or leading edge downstream or aft to the bulb 34 having maximum size and width, and then converging aft to the aft or trailing edge in a generally tear-drop profile for obtaining aerodynamically smooth flow thereover with minimal drag losses.

The radome assembly 20 should be configured as small as possible for minimizing drag losses due to its external location on the fuselage 14, but must be sufficiently large to house the antenna 26 and any required equipment therefor at that external location.

Accordingly, the frame 30 is generally planar and configured as shallow in height or thickness as possible, and conforms longitudinally and circumferentially with the outer skin 22 of the fuselage 14 for reducing drag losses. The frame 30 is preferably metal, or other high-strength material, for maximizing its strength to support the antenna 26, radome 32, and internal hinge 36 for both deploying open the radome 32 as shown in FIGS. 4 and 5, and stowing closed the radome 32 as shown in FIGS. 1-3.

Since the frame 30 is primarily a structural member that may be conventional cast or machined to include the special features further described hereinbelow, the frame 30 preferably also includes an aerodynamic fairing or skirt 40 fixedly joined around the perimeter of the frame 30 to aerodynamically smoothly blend the radome 32 to the fuselage 14 for reducing aerodynamic drag losses therefrom.

An exemplary embodiment of the skirt 40 is shown installed on the aircraft 14 in FIGS. 1-5, and in exploded view in FIG. 6, and is fixedly attached to the perimeter of the frame 30 by suitable fasteners.

Figure 11:
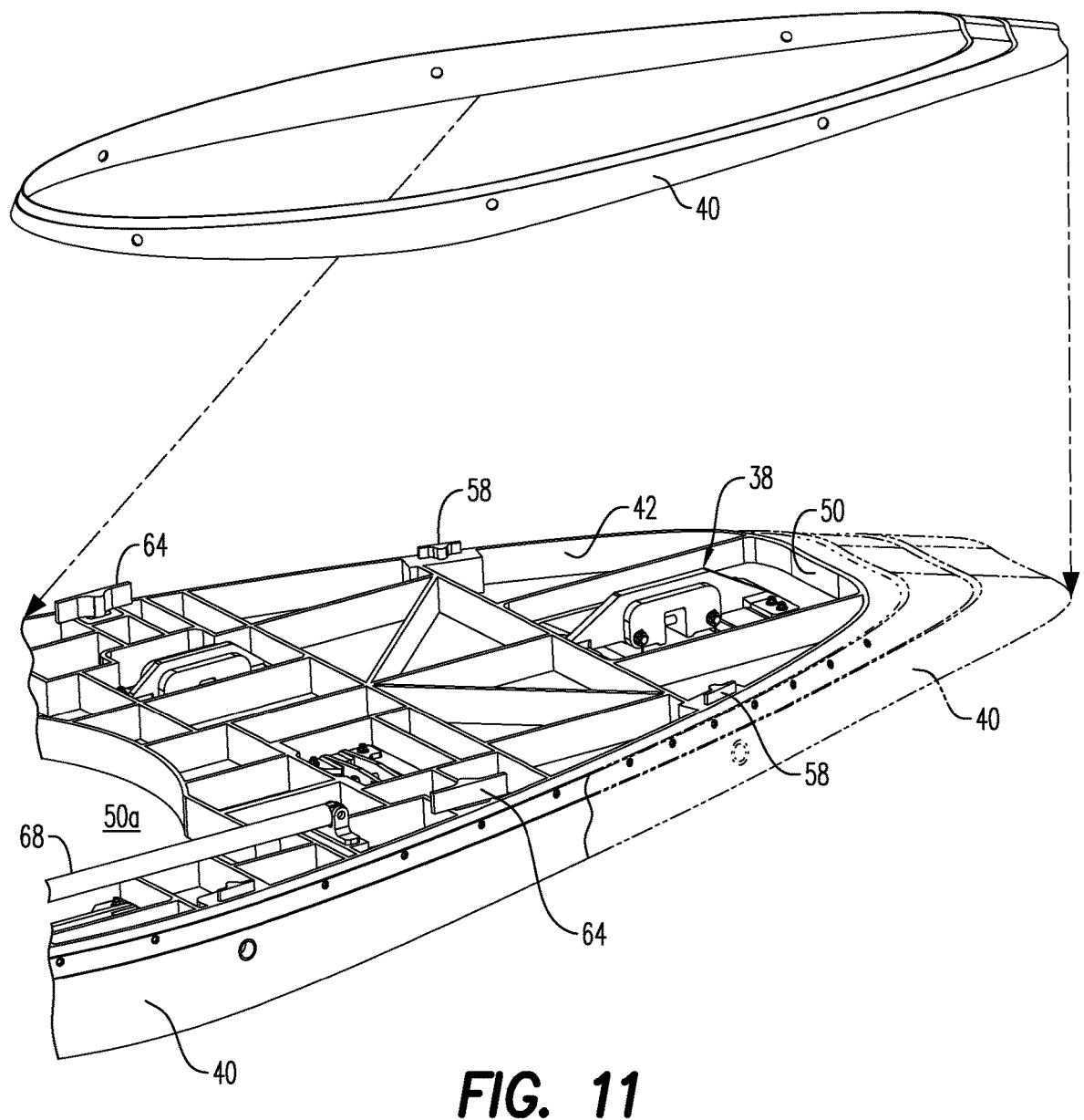
FIG. 11 is an exploded view of the skirt and frame shown in FIG. 6.

FIG. 11 illustrates that the exemplary frame 30 has a vertical perimeter wall 42, and that the skirt 40 has a complementary annular configuration sized to surround that perimeter wall 42, and be suitably attached thereto.

Figure 12:
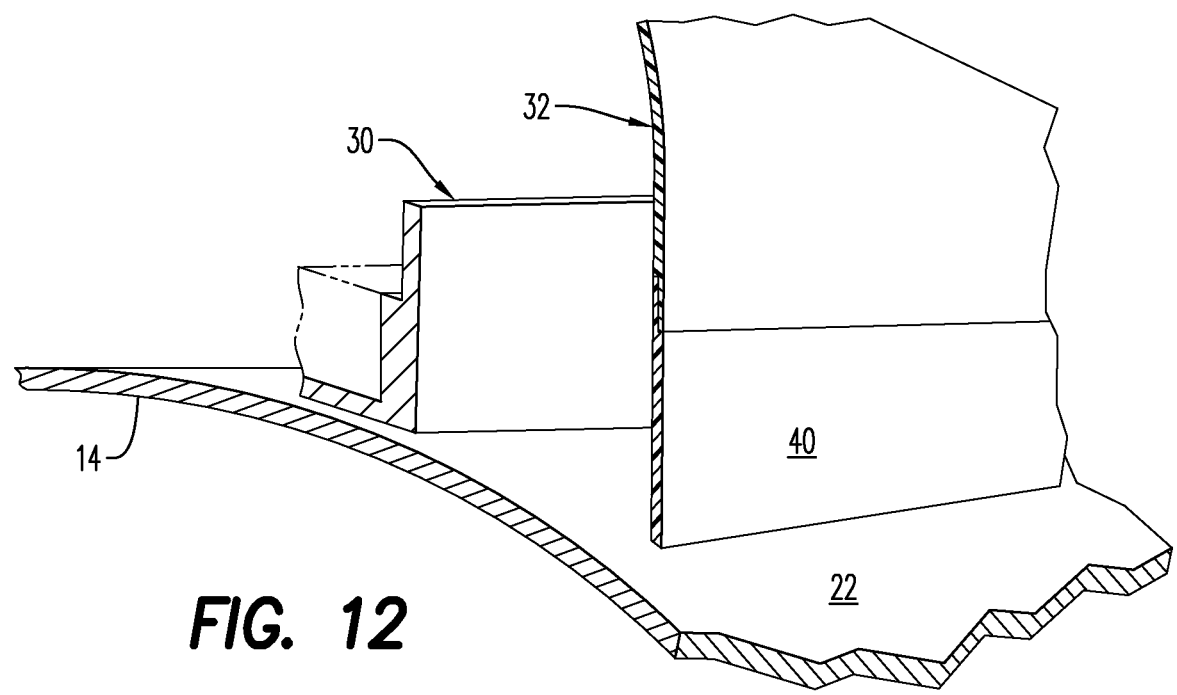
FIG. 12 is a cut-a-way view of the radome-skirt junction shown in FIG. 1 along line 12-12.
Figure 13:
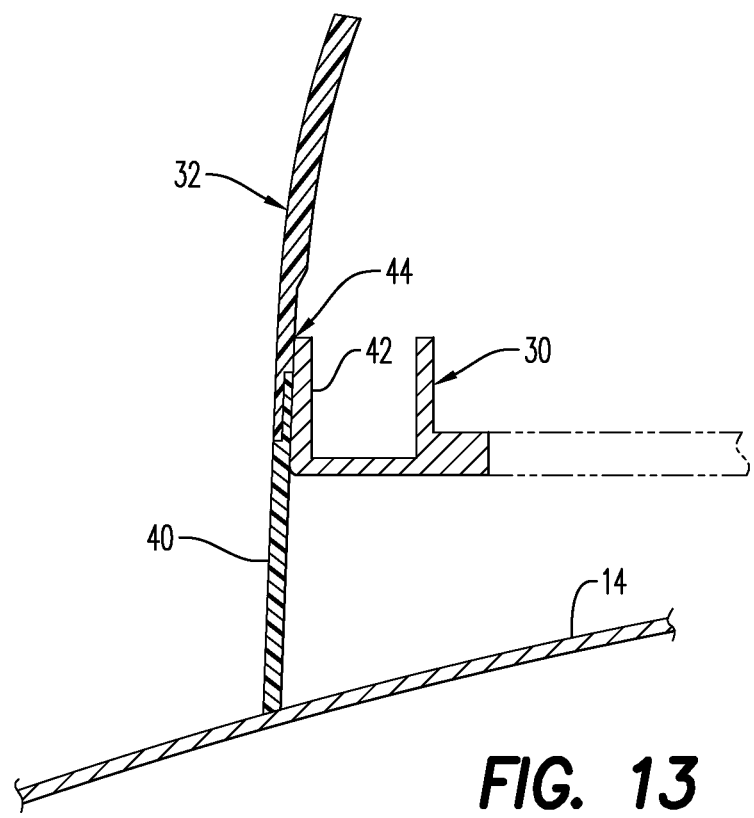
FIG. 13 is an elevational sectional view of the radome-skirt junction shown in FIG. 1 along line 13-13.

FIGS. 12 and 13 illustrate portions of the skirt 40 where it overlaps with the lower end of the radome 32 when stowed closed.

The skirt 40 provides an aerodynamic fairing between the frame and the aircraft fuselage. The skirt 40 is suitably curved to provide an aerodynamic transition surface between the vertical perimeter of the frame 30 and the cylindrical aircraft fuselage 14, as best shown in FIGS. 12 and 13. The sides of the frame 30 may have the same contour angle as the skirt 40 to ensure aerodynamic smoothness.

The skirt may be made from reinforced prepreq materials that have been pre-impregnated with a thermoset resin, which may be the same material as the radome 32 itself. The skirt 40 is suitably attached to the outer surface of the frame.

The aerodynamically shaped radome 32 and supporting frame 30 follow the outer curvature of the aircraft skin, with the skirt 40 being suitably contoured or curved to cover the frame and provide a smooth aerodynamic transition to the outer skin of the fuselage without requiring a large installation doubler, sealants, or fasteners through the aircraft skin.

External screw fasteners may be utilized to secure the top edge of the skirt to the frame. The fasteners may be distributed around the periphery of the frame. Nutplates may be located on the backside of the frame to secure the each screw. The nutplates may be secured to the frame work with rivets. These screw fasteners need only be removed if the skirt is to be removed.

As shown in FIGS. 12 and 13, the radome 32 overlaps the perimeter wall of the frame 30 generally vertically when stowed closed. The bottom edge of the radome 32 may have a half-step facing inwardly to complement a corresponding half-step facing outwardly at the top edge of the skirt 40 to collectively provide a lap joint thereat when the radome is stowed closed atop the skirt and frame. In this way, the outer surface of the radome 32 my blend smoothly with the outer surface of the skirt 40, which in turn may blend smoothly with the outer skin 22 of the fuselage around the full perimeter of the frame 30 as it changes contour and profile atop the cylindrical outer surface of the fuselage.

A suitable sealing device 44, such as a conventional bulb seal, as shown in FIG. 13 may be provided between the contact surfaces of the radome and the skirt to prevent water ingression and wind.

FIG. 6 illustrates in exploded view the complementary configurations of the frame 30, radome 32, and skirt 40 having similar longitudinally elongate tear-drop profiles, with the radome bulb 34 being disposed in or near the front of the radome. The radome 32 begins with a small nose at its front or forward end, and then diverges or spreads in size and width to the generally maximum size and width at the bulb 34 portion thereof. From the bulb 34, the radome converges aft to its tail located at the rear or aft end.

The supporting frame 30 has a similar tear-drop configuration, primarily in the horizontal plane due to its shallow height.

And, the annular skirt 40 surrounds the perimeter of the frame and radome in a complementary tear-drop configuration, and additionally provides aerodynamic blending vertically from the bulbous radome 32 to the cylindrical fuselage surface, with the blending contour suitably varying around the circumference of the frame for minimizing drag losses of the entire radome assembly 20.

A significant feature of the radome assembly 20 is the special configuration of the frame 30 initially shown in FIG. 6. As indicated above, the radome 32 is preferentially attached to the frame 30 by the exemplary hinge 36, which must be suitably hidden to prevent obstruction or interference with the RF signals handled by the antenna 26.

Accordingly, the frame 30 includes a plurality of vertical stiffening ribs 46 which intersect laterally with each other and with the surrounding vertical perimeter wall 42 to define corresponding pluralities of pockets 48 and seats 50.

The ribs 46 provide strength to the frame, and the hollow pockets 48 and seats 50 reduce weight while providing preferential locations for mounting the requisite features of the radome assembly 20 to permit its operation and allow ready access therein.

The pockets 48 are preferably open at the top and closed at the bottom by a common bottom plate of the frame 30, and may have any suitable configuration like square, rectangular, or triangular for example.

The seats 50 are preferably open both at the top and at the bottom, with corresponding apertures through the bottom plate, and may have any suitable configuration, typically rectangular, for example.

A plurality of the seats 50 are specifically configured as mounting seats for supporting corresponding ones of the anchors 38.

One of the seats, or a relatively large front seat 50a, is specifically configured and sized to contain the antenna 26 therein in the front portion or half of the frame 30. The antenna 26 may be suitably mounted to the frame 30 or to the underlying fuselage 14 as desired, and is configured inside the radome 32 for achieving the large RF window 28 shown in FIGS. 2 and 3.

The fuselage 14 can include a suitable aperture therethrough preferably aligned with the antenna mounting seat 50a as shown in FIG. 6 for providing any required electrical and mechanical connections between the antenna 26 and the aircraft Satcom equipment or system 24.

The radome bulb 34 is spherical above the front seat 50a for permitting rotation of the antenna 26 during operation.

As best shown in FIGS. 6 and 7, the mounting seats 50 are preferentially distributed around the perimeter of the frame 30, including forward and aft ends thereof and both port and starboard sides of the frame for distributing the several anchors 38 over the fuselage 14, and thereby suitably distributing mounting and operational loads therebetween.

Since the frame 30 has a tear-drop configuration, two mounting seats 50 and corresponding anchors 38 are located at the front end on both port and starboard sides of the frame; two seats and anchors are located on opposite sides of the antenna mounting seat 50a; two seats and anchors are located behind the antenna mounting seat 50a on both sides; and a single seat and anchor are located at the center of the aft end of the frame.

In this way, seven anchors 38 and corresponding seats 50 are distributed over the surface area of the frame to preferentially mount the frame to the underlying fuselage 14 and carry all operational loads thereto.

Significantly, the hollow seats 50 permit the corresponding anchors 38 to be hidden inside the frame 30 below the tops of the ribs 46 surrounding each seat 50, and thereby below the RF window 28, to prevent obstruction of the RF signals with the antenna 26.

Figure 10:
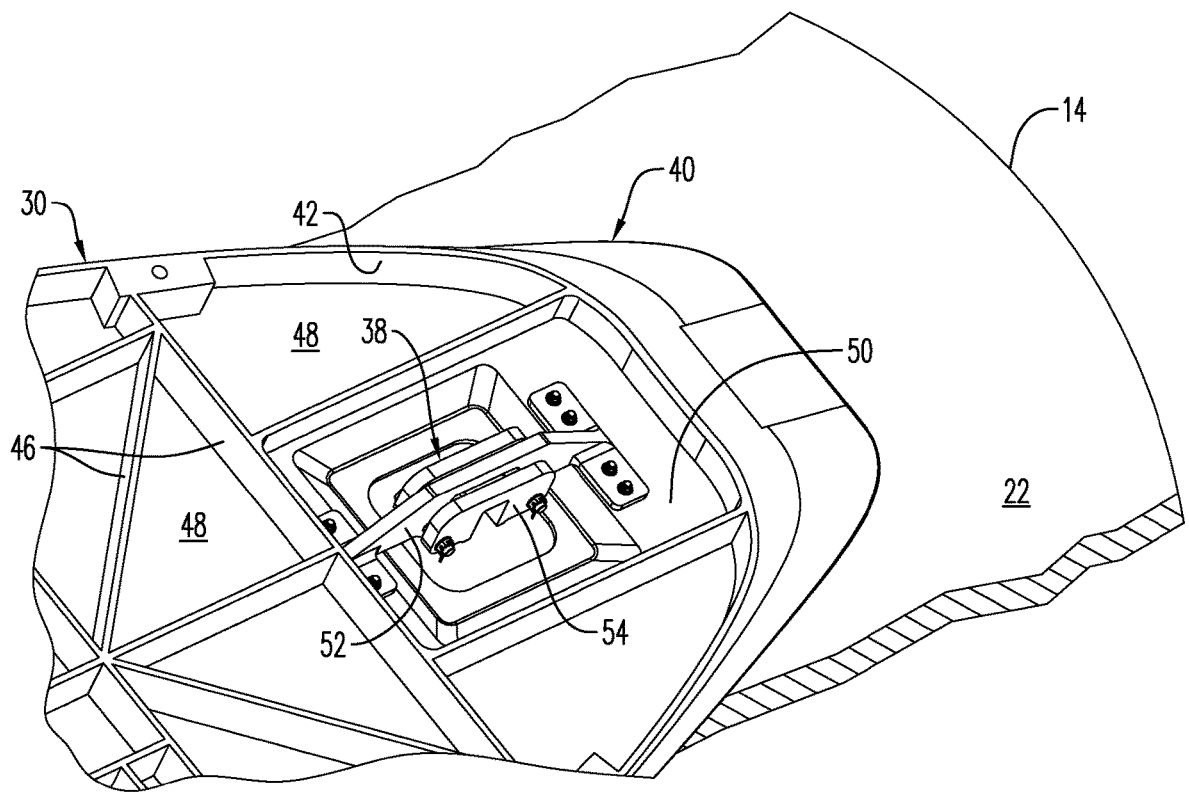
FIG. 10 is a top view of an exemplary anchor affixing the frame to the aircraft fuselage shown in FIG. 7 within the circle labelled 10-10.

In a preferred embodiment shown in FIG. 10 each of the seven anchors 38 includes a bridge 52 fixedly attached to the frame 30 inside its mounting seat 50, and a cooperating clevis 54 suspended from the bridge 52 for being fixedly attached to the aircraft fuselage 14.

Each bridge 52 comprises a vertical rib bridging the bottom aperture in the seat 50, and having end feet fixedly attached to the frame base plate.

Each clevis 54 comprises two vertical ribs supported from a common bottom plate, with the two ribs being spaced apart to receive the bridge 52 therebetween. As shown in FIG. 6, the several devises 54 are suitably mounted to the outer skin of the fuselage 14, and extend upwardly into the corresponding mounting seats 50 as shown in FIG. 10, and attached to the corresponding bridges 52 by suitable fasteners or bolts.

In this way, the frame 30 may be mounted to the external skin of the fuselage with the several anchors 38, and is itself removable during maintenance if required. Furthermore, this external mounting of the frame 30 locates the antenna 26 external to the fuselage, leaving free the inside of the fuselage for other purposes.

Since the radome 32 is hinged to the frame 30, a plurality of latches 56 are preferentially configured and distributed around the perimeter of the frame 30 for selectively locking closed the radome 32 atop the frame and unlocking open the radome from the frame pivotally outwardly about the hinge 36.

FIGS. 14-17 illustrate an exemplary embodiment of the latches 56 which are preferentially configured to lock closed the radome 32 atop the supporting frame 30, yet also avoid RF interference or obstruction with operation of the antenna 26. Like the hinge 36 introduced above, the latches 56 are preferentially located and hidden in the frame 30 with no interference to the main signal beam of the antenna whether the transmission path is in the upstream (to the satellite) or downstream (from the satellite) mode.

The latches 56 are preferably sized and located to permit the radome 32 to open for access, and to close holding the radome to the frame 30, while transmitting and reacting necessary loads generated in an operating envelope.

Each latch assembly should include some form of main latch or pin latch design, an operating lever, and a safety push button device. The latch housing main body may be secured to the frame with bolts. The upper portion of the latch or pin portion of the assembly can be secured to the inner surface of the radome shell.

The outside face of the latch should be visible and accessible through a small opening in the fairing or skirt. Multiple latches are preferred and located around the periphery of the radome shell to secure it to the frame.

The latch mechanism should preferably be mounted flush with respect to adjacent aircraft exterior surface areas and may be installed in a generally concealed manner Each latch should be resistant to opening itself under all adverse operating conditions.

Figure 16:
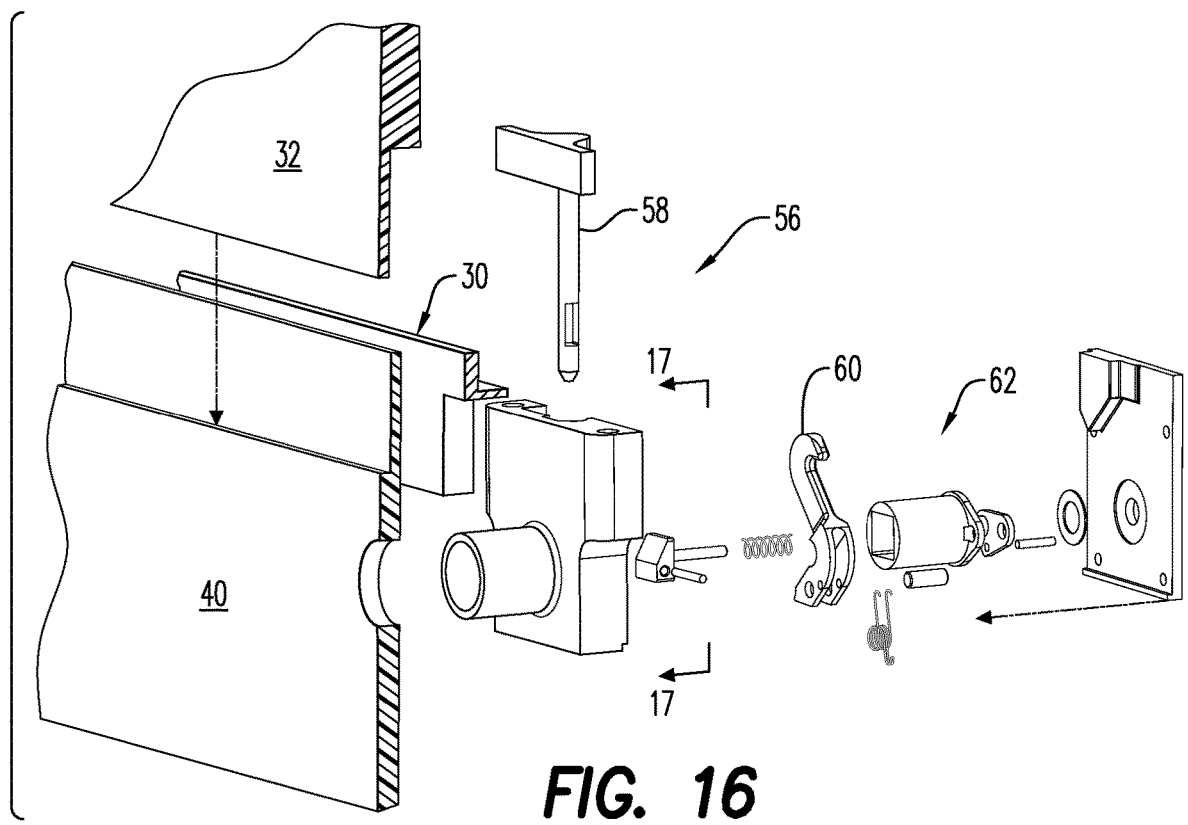
FIG. 16 is an exploded elevational view of an exemplary latching mechanism for the accessible radome assembly.
Figure 17:
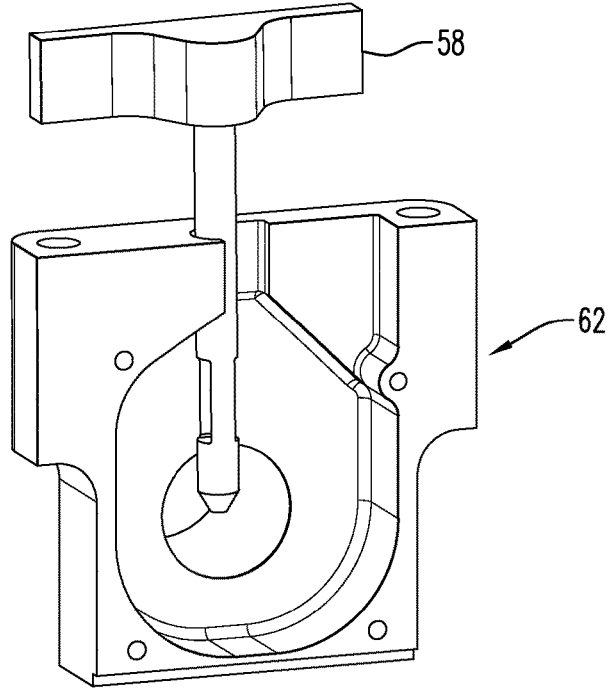
FIG. 17 is an outward-facing elevational view of the latch pin and locking housing shown in FIG. 16 along line 17-17.

An exemplary embodiment of the latches 56 is initially shown in FIG. 16, and includes a vertical latch pin 58 suspended from the perimeter of the radome 32 and a cooperating hook 60 mounted along the perimeter of the frame 30 to selectively lock and unlock the radome latch pin 58 from the frame 30.

Each latch pin 58 includes a supporting tab fixedly attached to the inside of the radome perimeter edge, and is fixedly attached thereto by suitable fasteners. Since the radome 32 is formed of composite laminations, those laminations may be locally increased in thickness to provide adequate support for suspending the latch pins 58.

The latch hooks 60 are suitably mounted in a cooperating latch mechanism 62 having a housing to contain the hook 60 and receiving therein the corresponding latch pin 58 for being selectively locked therein.

In FIG. 16, the latch pins 58 extend downwardly from the bottom edge of the radome 32, and have an slot in the distal end thereof.

The latch mechanisms 62 are suitably mounted inside the perimeter of the frame 30, for receiving the corresponding latch pins 58 as the radome 32 is stowed closed. The hooks 60 are suitably actuated to engage the corresponding slots in the latch pins 58 to lock the radome closed atop the frame 30.

Figure 14:
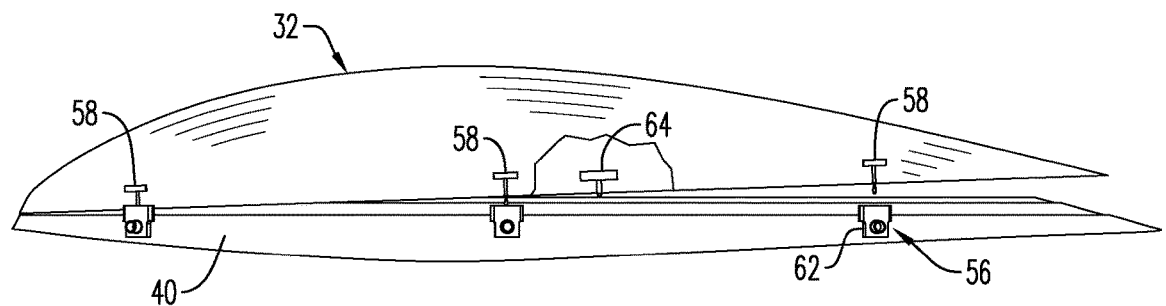
FIG. 14 is a side view of the radome deployed slightly open atop the supporting frame, with corresponding latch and guide pins.
Figure 15:
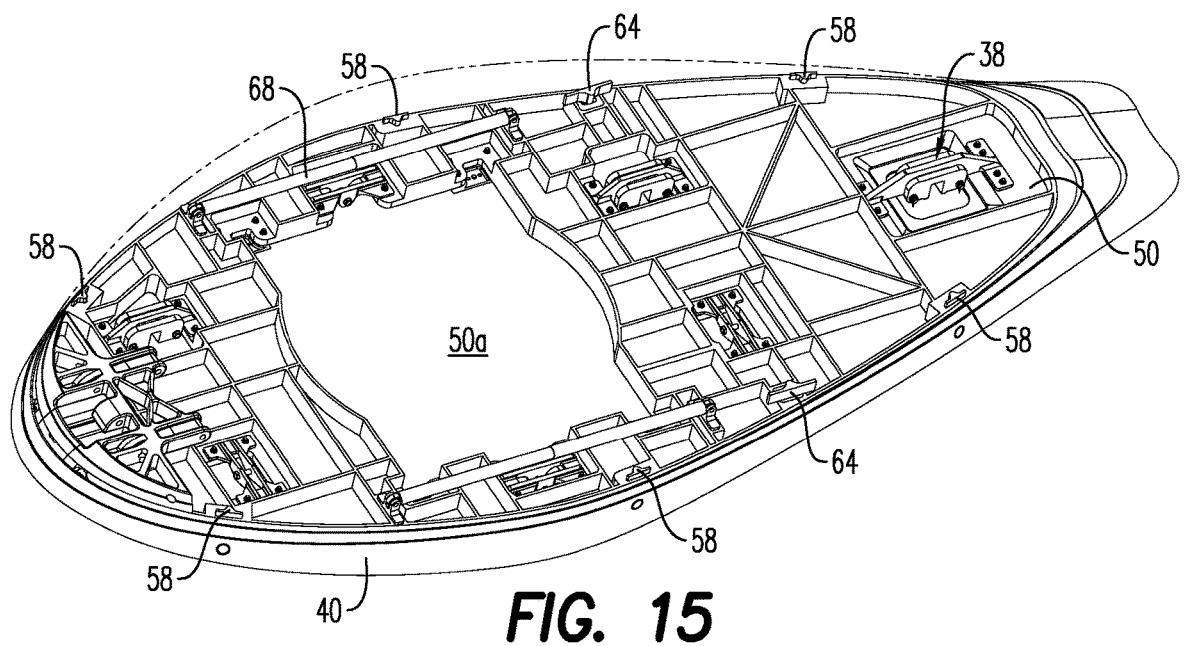
FIG. 15 is a top view of the frame showing the latch and guide pins removed from the radome (not shown), along with exemplary mounting anchors for the frame.

As shown in FIGS. 14 and 15, six exemplary latches 56 are distributed around the perimeter of the frame 30 on both port and starboard sides thereof, with two near the front end of the frame, two near the aft end, and two on the opposite sides of the antenna mounting seat 50a. In this way, the tear-drop shaped radome 32 may be adequately retained or locked closed during aircraft flight, with the several latches 56 ensuring a tight sealed fit between the radome 32 and the adjoining skirt 50 atop the supporting frame 30.

As shown in FIGS. 14-16, the latches 56 are preferentially configured to be hidden primarily inside the frame 30, and below the RF window 28 to prevent interference with the RF signals for the antenna 26. In particular, the hooks 60 and latching mechanisms 62 are fully hidden inside the frame 30 and distributed around the perimeter, and below the RF window 28.

The corresponding latch pins 58 have minimal size and are suspended downwardly from the perimeter edge of the radome 32, and are also located below the RF window 28.

In this way, the latches 56 along with the hinge 36 are mostly hidden inside the shallow frame 30 itself, and hidden below the RF window 28.

Since the radome 32 is hinged at the single front hinge 36 in the exemplary embodiment shown in FIGS. 4 and 5, it is subject to slight lateral movement during stowing due to manufacturing tolerances.

Figure 18:
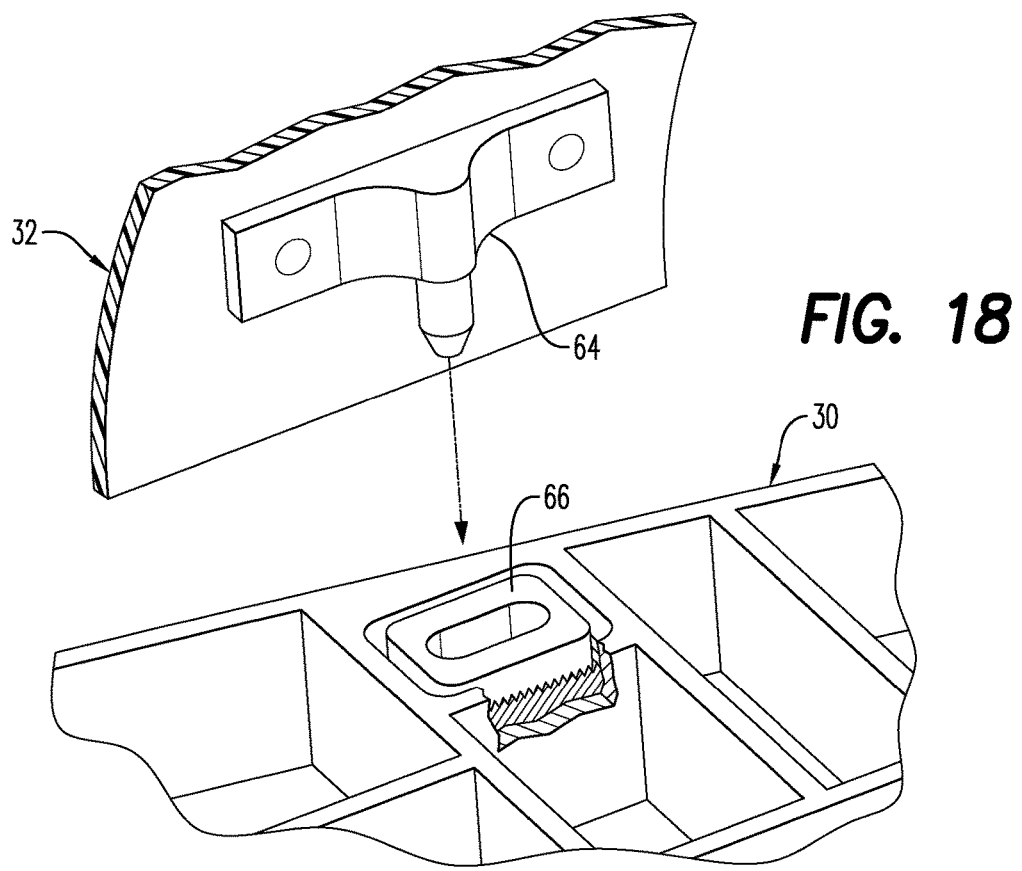
FIG. 18 is an exploded view of an exemplary guide pin mounted to the radome shown in FIGS. 14 and 15 for controlling alignment with the supporting frame.

Accordingly, and as shown in detail in FIG. 18, a plurality of index or guide pins 64 are suitably suspended from the perimeter of the radome 32 remote from the hinge 36, and a plurality of mating guide sockets 66 are attached to the perimeter of the frame 30 for maintaining alignment of the radome 32 atop the frame 30 when stowed closed thereatop with the guide pins 64 being inserted or disposed in the guide sockets 66.

As the radome 32 pivots downwardly in FIGS. 4 and 5 during stowing movement, the corresponding guide pins 64 will engage their respective sockets 66 as shown in FIG. 18 to ensure proper alignment of the radome 32 atop the frame 30 and the cooperating skirt 40.

As shown in FIGS. 12 and 13, the radome 32 adjoins the skirt 40 in a lap joint around the perimeter of the radome. A slight clearance or gap is therefore created at this lap joint, and that gap can be adjusted or maintained by the configuration of the guide pins 64 and sockets 66.

As shown in FIG. 18 each guide socket 66 is in the form of a small plate having a central aperture, and whose bottom is preferably serrated. The socket is suitably mounted to the frame, by fasteners, and receives a corresponding guide pin 64 when the radome is stowed.

Two guide pins 64 are located on opposite sides of the radome 32 near the aft end opposite to the forward-hinged end, and engage the respective guide sockets 66 as the radome is stowed. The serrated guide socket plate 66 is adjustable in location forward and aft along its seat in the frame to correspondingly adjust alignment of the radome 32 atop the frame 30.

The radome to frame overlap gap at the skirt can be adjusted and maintained by two sets of adjustment pins 64 and sockets 66 by suitable indexing of the serrations. This adjustment hardware permits a uniform gap to be maintained around the perimeter of the skirt 40, thusly accounting for manufacturing tolerance in the radome 32, frame 30, and skirt 40.

The locating or guide pins 64 may be fastened to the left and right inner surfaces of the radome 32 by screw fasteners. The serrated base plate may be attached to the upper side or surface of the frame 30 by suitable fasteners. Upon closing of the radome 32, the pin 64 will index into the base plate socket 66 permitting proper alignment while closing. The serrated bottom of the base plate allows for forward to aft adjustment of the locating pin 64 to the frame 30. A slot may be machined into the frame 30 just below the serrated socket plate 66 for proper pin placement.

Figure 19:
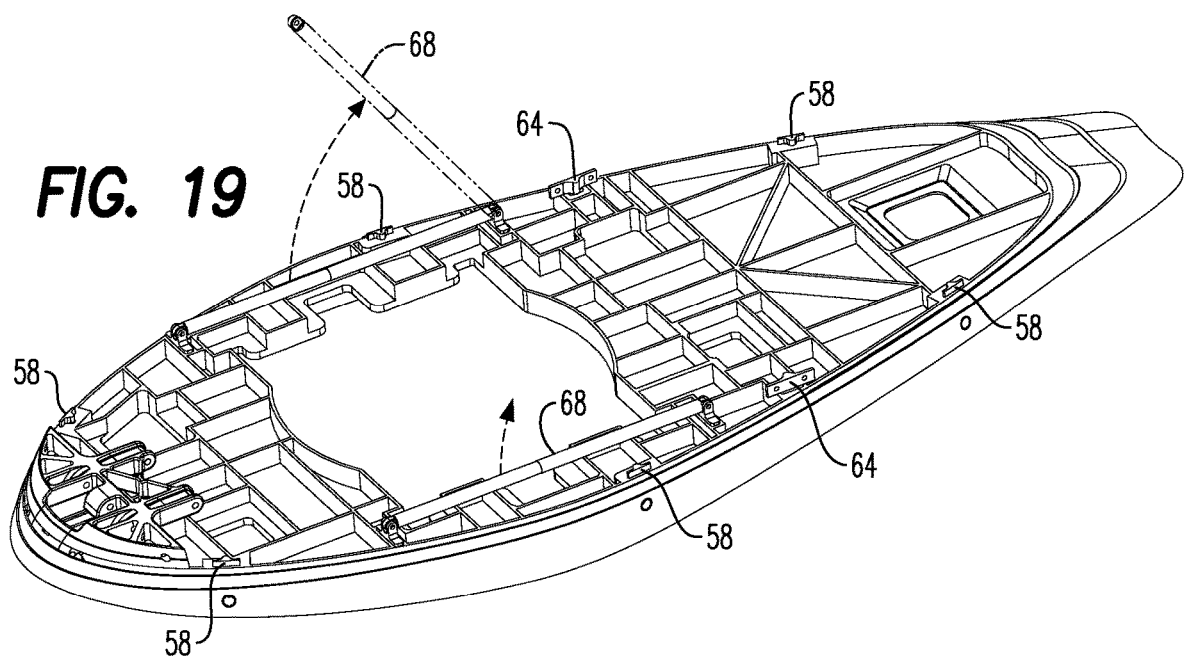
FIG. 19 is a top, isometric view of the frame, like FIG. 15, including various latch and guide pins suspended from the radome (not shown) to engage corresponding apertures in the frame, with an exemplary hold-open rod matching the configuration shown in FIG. 4.

As shown in FIGS. 4, 5, and 19, a pair of hold-open rods 68 are pivotally mounted to the frame 30 on opposite port and starboard sides of the antenna mounting seat 50a. The rods 68 are stowed flush in corresponding seats in the frame 30, with the radome 32 stowed closed, and are manually pivotable outwardly to support the radome open when deployed.

In FIG. 4, the radome 32 may be manually deployed open to a maximum opening angle C of about 60 degrees, and then the two hold-open rods 68 may be manually pivoted upwardly from their attached ends at the frame 30, with the opposite distal ends being disposed in corresponding sockets or seats inside the radome 32. An open position angle of only 60 degrees is preferred for maintenance personnel to gain access to the antenna 26 and any related equipment housed inside the radome 32.

Stowing closed the radome 32 merely requires manually repositioning the two rods downwardly into their corresponding seats in the frame 30, as shown in FIG. 19; with the radome 32 also being manually lowered into its stowed closed position atop the frame 30.

Since the two rods 68 have corresponding seats hidden inside the frame 30 below the RF window 28, they also do not provide any obstruction of the antenna RF signals.

The hold-open rods 68 may be of fixed length, telescoping, or scissor-folded by design. Any commercial type hold-open rod can be used once it has been retrofitted for attaching to the machined or cast frame 30.

The two hold-open rods 68 provide a simple and low-profile mechanism to secure the radome 32 while in the open position. The hold-open rods are housed under the radome 32 while in the stowed or down position. During flight the hold-open rods are secured to the frame 30 in the down or stowed position. Once the radome 32 has been unlatched and raised, the hold-open rods may then be extended and used to secure the radome in the opened position.

Figure 9:
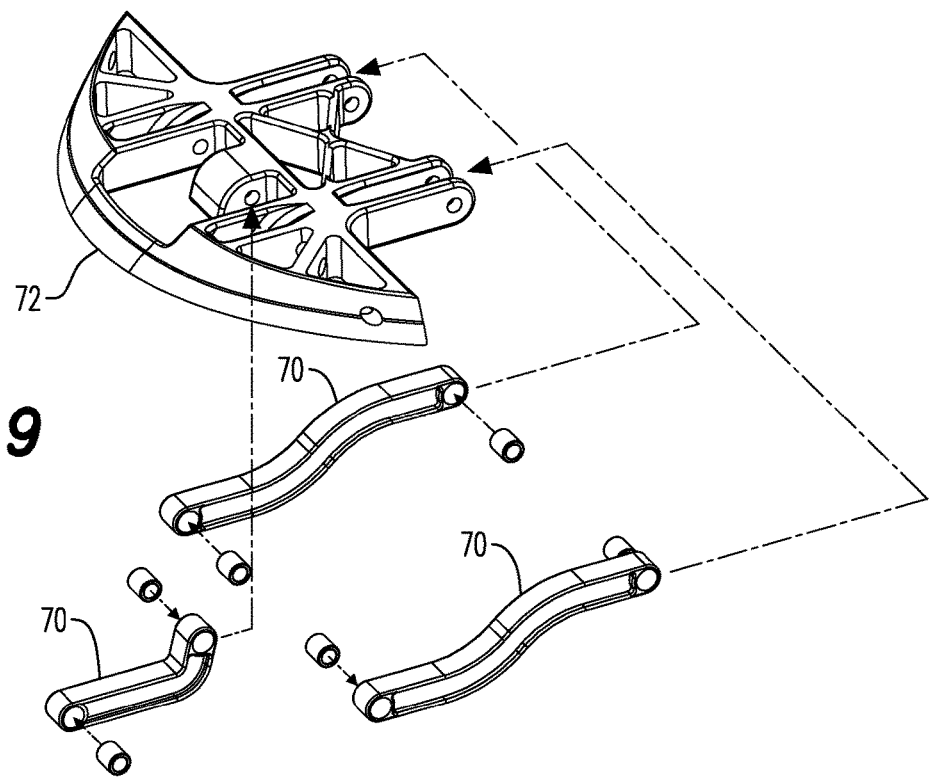
FIG. 9 is an exploded view of the front hinge shown in FIG. 8.

In view of the tear-drop shape of the radome 32 with a narrow front nose, and the complementary narrow configuration of the forward end of the frame 30, the forward hinge 36 shown in the exemplary embodiment of FIGS. 6, 8 and 9 is preferentially configured for this limited space.

In particular, the forward hinge 36 includes a plurality of links 70 extending longitudinally between the forward ends of the frame 30 and radome 32, with the proximal ends of the links 70 being pivotally mounted in corresponding seats machined in the frame 30, and the distal ends of the links 70 being pivotally joined to a corresponding mounting bracket 72, which in turn is fixedly attached inside the nose of the radome 32.

The bracket 72 has a flat, low-profile configuration mounted horizontally inside the nose of the radome 32. The corresponding seats formed in the nose of the frame 30 also have a flat, low-profile configuration. And the links 70 extend longitudinally and are hidden inside the frame 30 when the radome 32 is stowed closed.

When the radome 32 is deployed open as shown in FIG. 8, the links 70 are pivoted outwardly and almost vertically.

The two outboard links 70 are identical to each other, and share common pivot axes in the frame 30 and in the mounting bracket 72. The center link 70 is shorter than the outboard links 70 and has different pivot axes in the frame 30 and bracket 72 both forward of the outboard link pivot axes.

In this configuration, the outboard links and center link define with the frame 30 and bracket a conventional four-bar linkage for obtaining compound kinematic motion of the radome 32 as it is deployed open. This compound kinematic motion ensures that the radome is lifted at its nose as it pivots outwardly relative thereto to avoid interference with the supporting frame 30 and the surrounding skirt 40.

The circumferential spacing of the three links 70 and the correspondingly wide bracket 72 laterally distribute the opening loads from the radome 32 to the frame 30 and thereby minimize undesirable lateral deflection or movement of the radome 32 as it is opened or closed.

The forward hinge 36 is preferably formed of metal, like aluminum, for adequate strength, but in its generally planar form or configuration when stowed closed it remains below the RF window 28 to avoid interference with the antenna RF signals.

The radome hinge locations, along with the latch assembly locations, are preferably machined in the frame 30 to allow for ease of installation. In the embodiment disclosed above, the hinge location is at the forward end of the frame 30. In alternate embodiments, the hinge(s) may be located at the aft end of the frame or at center positions which can be pre-machined into each frame depending on customer preferred locations. The pockets 48 can be milled from both the top or bottom of the frame 30 as desired to reduce weight.

The radome 32 may be permanently attached to the frame 30 through the specified forward, aft, or middle hinges, as desired according to aircraft customer requirements. The hinges permit the radome to be unlatched, lifted for access, and remain attached to the frame, without the need for the multitude of fasteners previously used in conventional practice to adequately secure the radome to the aircraft fuselage.

Any of the three mentioned hinge locations may functionally utilize the same 60 degree access opening. The hinges may be custom designed, or stock items as appropriate for different configurations. Each hinge can be securely fastened to the frame utilizing suitable fasteners while the upper end of the hinge can be securely fastened to the radome shell with flush fasteners. All fasteners holes in the radome can be countersunk to allow for aerodynamic smoothness. Additional plies can be laminated to the inner surface of the radome shell to build up the thickness of the fiberglass skin to resist any of the hinge fasteners pulling through the structure.

Figure 20:
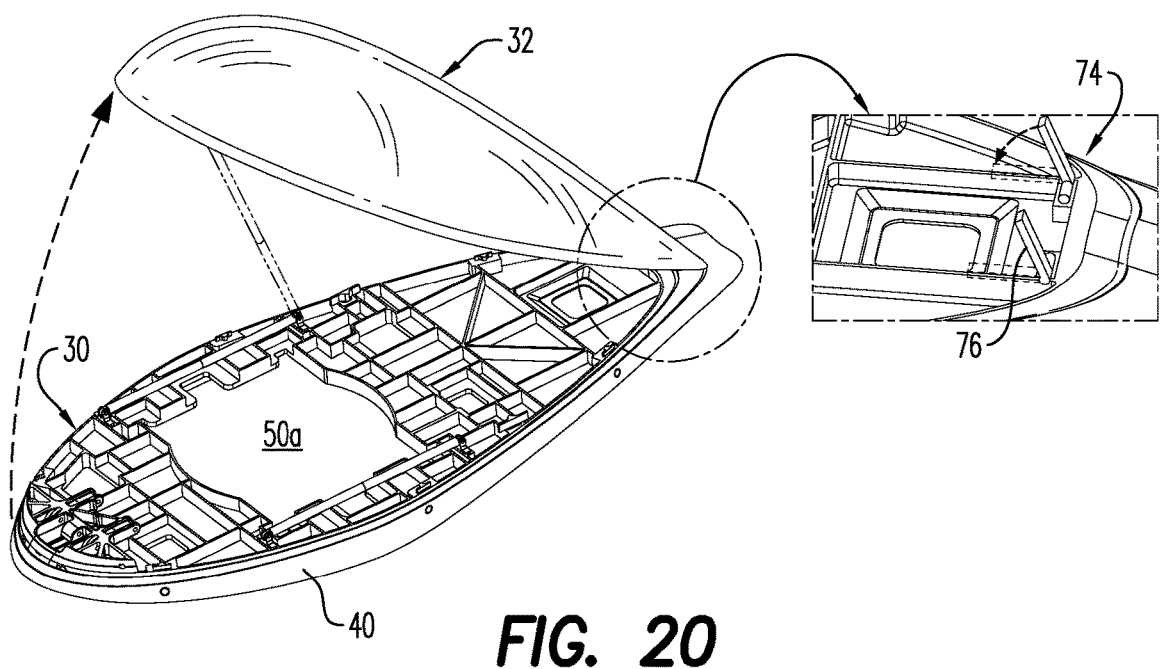
FIG. 20 is an isometric view of the radome assembly modified to include an aft-mounted hinge for the radome.

FIG. 20 illustrates an alternate embodiment of the radome assembly wherein the hinge 74 is disposed at the aft ends of the frame 30 and radome 32 and includes a plurality of links 76 extending longitudinally therebetween, with the links 76 being hidden inside the frame 30 when the radome 32 is stowed closed (as shown in dashed line in FIG. 20), and being pivoted outwardly with the radome 32 when deployed open.

Two hinge links 76 may be spaced laterally or circumferentially, with their proximal ends pivotally mounted in corresponding seats machined in the aft end of the frame 30, and the forward or distal ends being fixedly attached to corresponding brackets inside the aft end of the radome 32.

These hinge links 76 may have conventional configurations to pivot open and closed the radome 32 atop the frame 30, but are preferentially configured and mounted for being stored or hidden inside the aft end of the frame 30 and below the RF window 28 to prevent interference of the antenna RF signals.

The FIG. 20 embodiment may be otherwise identical to the forward-hinge embodiment disclosed above including the seven anchors 28, six latches 56, two hold-open rods 68 differently mounted to hold open the forward-open radome 32, and the two guide pins 64 differently located at the forward end of the frame 30, if desired.

Figure 21:
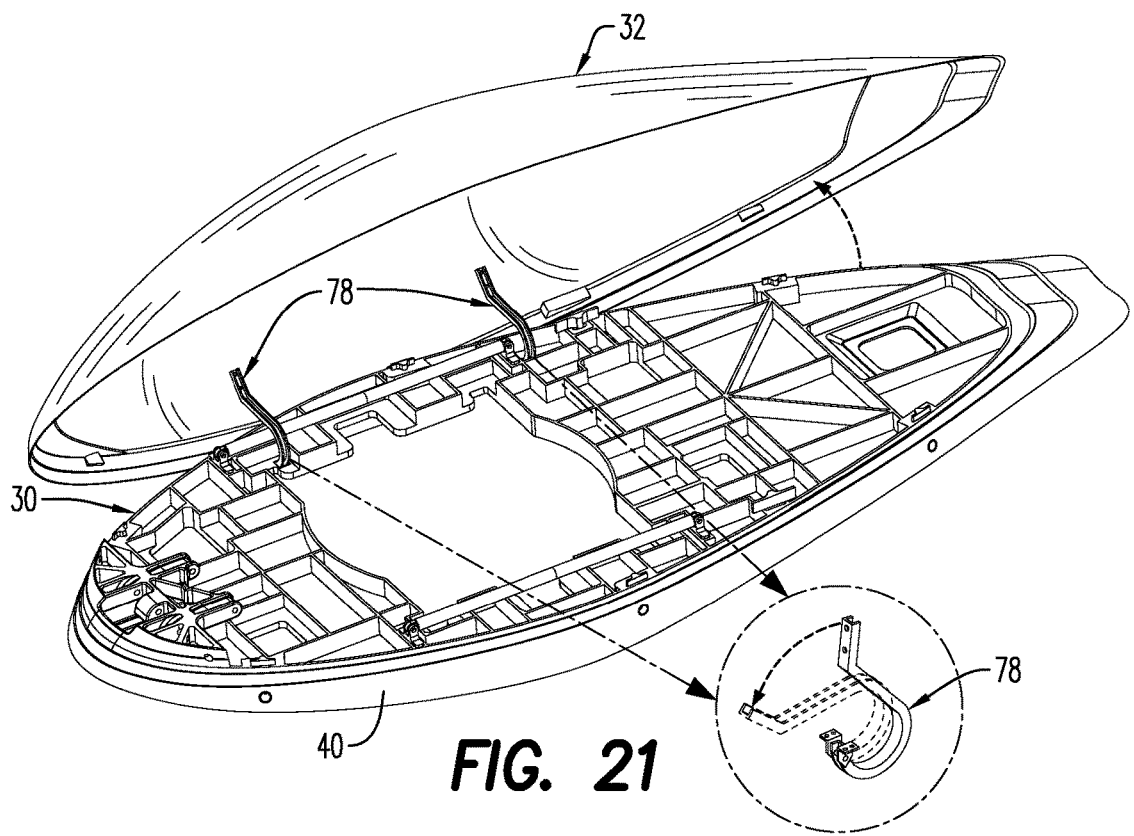
FIG. 21 is an isometric view of the radome assembly modified to include a side-mounted hinge for the radome.

In FIG. 21, two hinges 78 are spaced longitudinally apart along one side of the frame 30 and radome 32, such as along the middle of the starboard side thereof. The two middle hinges 78 are in the form of conventional links extending laterally or circumferentially between the frame 30 and radome 32, with the link hinges 78 being hidden inside the frame 30 when the radome 32 is stowed closed (as shown in dashed line in FIG. 21), and being pivoted outwardly with the radome when deployed open.

Each hinge 78 has a J-shape, with a pivotable or hinged proximal end attached in a corresponding seat inside the frame 30, and a distal end fastened to the inside perimeter of the radome 32.

The radome assembly 20 disclosed above preferentially integrates the frame 30, radome 32, hinges 36,74,78, and latches 56 for permitting easy opening and closing of the radome atop the frame without obstruction or interference with the RF window 28, and RF signals channeled therethrough for operation of the antenna 26.

Most features for readily opening and closing the radome are disposed and effectively hidden inside the shallow supporting frame, with cooperating features being attached to the lower perimeter of the radome, all below the RF window to avoid RF signal interference with the enclosed antenna.

The frame is securely attached to the underlying aircraft fuselage without occupying internal fuselage space, and the antenna and radome are securely attached to the supporting frame with convenient features to manually open and close the radome, without requiring its complete removal from the aircraft.

The radome may be differently configured with forward, aft, or middle hinges for providing ready access to the antenna and other internal equipment, and the latch system ensures secure closure of the radome for in-flight use while accommodating the various mechanical and aerodynamic loads experienced during flight operation.

The radome and frame can be designed and tuned together to accommodate the latch systems required to firmly close the radome. The frame may be specifically designed to accept various radome latches.

The system may include the hold-open rods to allow the radome to remain attached to the frame while the frame and RF equipment below the radome is accessed.

Hinges, latches, and adjustment pins are preferably installed below the top of the frame to prevent radio-frequency (RF) interference.

Hinges can be designed flush with the Outer Mold Line (OML) of the radome and below the top of frame.

Fair and junction with the skirt can be controlled by the adjustable guide pins, and the shape and seal on the Inner Mold Line (IML) of the radome.

The supporting frame can be preferentially machined to incorporate various hinge designs and latch assemblies for different aircraft configurations.

Maintenance of the radome assembly can be performed with reduced or little effort since little effort is needed to open or close the latches on the frame.

Labor required to service the radome system will be minimal because the operator will only need to unhook the latches and activate the hold-open rods.

Minimal tooling will be required to adjust the latches, with no FOD developed from damaged fasteners under previously fastened radomes.

Human factor issues are resolved as only a few latches need be opened and closed while the hold-open rods and hinges support the radome so it does not have to be removed and stored while the IFE equipment is accessed.

Accessibility during maintenance is greatly improved by only requiring latches to be opened and closed while the radome remains attached to the frame by the hinge and hold-open rods.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A radome assembly (20) for mounting an antenna (26) to an aircraft fuselage (14) comprising:
a frame (30) including a perimeter and a perimeter wall (42) bounding a plurality of laterally intersecting ribs (46) defining a plurality of pockets (48) and seats (50), and conforming in contour with said fuselage (14) for being fixedly mounted outside thereto;
a radome (32) including a perimeter and having an aerodynamically streamlined elongate contour that conforms in perimeter shape with said frame (30) and including a central bulb (34) spaced from said frame (30) to house said antenna (26) therein, said radome (32) being tuned in configuration to define an unobstructed radio-frequency (RF) window (28) diverging outwardly from atop said frame (30); and
said radome (32) being pivotally mounted atop said frame (30) by a hinge (36,74,78) pivotally mounted in a corresponding seat (50) in said frame (30) and hidden inside said frame (30) below said RF window (28) when said radome (32) is stowed closed atop said frame (30) and antenna (26) with said radome (32) overlapping said perimeter wall (42).

2. A radome assembly according to claim 1 wherein:
said aircraft fuselage (14) is cylindrical along a longitudinal axis (12) between a front nose (16) and an aft tail (18);
said frame (30) is longitudinally elongate to conform longitudinally with said fuselage (14) between said nose (16) and tail (18), and includes a plurality of anchors (38) for being fixedly attached to said fuselage (14); and
said radome (32) is longitudinally elongate and sized to house said antenna (26) atop said frame (30) to hide said hinge (36) below said RF window (28).

3. A radome assembly according to claim 2 wherein:
said frame (30) conforms longitudinally and circumferentially with an outer skin (22) of said fuselage (14); and
said frame (30) includes an aerodynamic skirt (40) fixedly joined around the perimeter thereof to aerodynamically smoothly blend said radome (32) to said fuselage (14) for reducing aerodynamic drag losses therefrom.

4. A radome assembly according to claim 3 wherein said frame (30), radome (32), and skirt (40) have similar longitudinally elongate tear-drop profiles, with said radome bulb (34) being disposed in the front of said radome (32), with said radome converging aft therefrom to the rear of said radome for smoothly blending with said fuselage (14).

5. A radome assembly according to claim 2 wherein:
said frame (30) includes a front seat (50a) for mounting said antenna (26); and
said radome bulb (34) is spherical above said front seat (50a) for permitting rotation of said antenna (26) during operation.

6. A radome assembly according to claim 2 wherein said frame (30) includes:
a front seat (50a) being sized to contain said antenna (26); and
a plurality of mounting seats (50) supporting corresponding ones of said anchors (38).

7. A radome assembly according to claim 6 wherein each of said anchors (38) includes a bridge (52) fixedly attached to said frame (30) inside said mounting seat (50), and a clevis (54) suspended from said bridge (52) for being fixedly attached to said aircraft fuselage (14).

8. A radome assembly according to claim 7 wherein said mounting seats (50) are distributed around the perimeter of said frame (30) including forward and aft ends thereof and both sides of said frame (30) for distributing said anchors (38) over said fuselage (14).

9. A radome assembly according to claim 8 wherein said anchors (38) are hidden below said ribs (46) inside said mounting seats (50).

10. A radome assembly according to claim 2 further comprising a plurality of latches (56) distributed around the perimeter of said frame (30) for selectively locking closed said radome (32) atop said frame (30) and unlocking open said radome (32) from said frame (30) pivotally outwardly about said hinge (36).

11. A radome assembly according to claim 10 wherein each of said latches (56) comprises a latch pin (58) suspended from the perimeter of said radome (32) and a cooperating hook (60) mounted along the perimeter of said frame (30) to selectively lock and unlock said radome latch pin (58) from said frame (30).

12. A radome assembly according to claim 11 wherein said hooks (60) are hidden along said frame (30 below said RF window (28).

13. A radome assembly according to claim 11 wherein said latches (56) are distributed along both sides of said frame (30), including both forward and aft ends thereof.

14. A radome assembly according to claim 2 further comprising a plurality of guide pins (64) suspended from the perimeter of said radome (32) remote from said hinge (36), and a plurality of mating guide sockets (66) attached to the perimeter of said frame (30) for maintaining alignment of said radome (32) atop said frame (30) when stowed closed thereatop with said guide pins (64) disposed in said guide sockets (66).

15. A radome assembly according to claim 14 wherein said guide sockets (66) each comprise a serrated plate having a central aperture for receiving a corresponding guide pin (64), and said plate being adjustable in location forward and aft along said frame (30) to adjust alignment of said radome (32) atop said frame (30).

16. A radome assembly according to claim 2 further comprising a hold-open rod (68) pivotally mounted to said frame (30) and stowed flush therein with said radome (32) stowed closed, and pivotable outwardly to support said radome (32) open when deployed.

17. A radome assembly according to claim 2 wherein said hinge (36) is disposed at the forward ends of said frame (30) and radome (32) and includes a plurality of links (70) extending longitudinally therebetween, with said links (70) being hidden inside said frame (30) when said radome (32) is stowed closed, and being pivoted outwardly with said radome (32) when deployed open.

18. A radome assembly according to claim 2 wherein said hinge (74) is disposed at the aft ends of said frame (30) and radome (32) and includes a plurality of links (76) extending longitudinally therebetween, with said links (76) being hidden inside said frame (30) when said radome (32) is stowed closed, and being pivoted outwardly with said radome (32) when deployed open.

19. A radome assembly according to claim 2 wherein said hinge (78) is disposed along one side of said frame (30) and radome (32) and includes a pair of links extending laterally therebetween, with said links being hidden inside said frame (30) when said radome (32) is stowed closed, and being pivoted outwardly with said radome when deployed open.

20. A radome assembly according to claim 2 wherein:
said frame (30) conforms longitudinally and circumferentially with an outer skin (22) of said fuselage (14);
said frame (30) includes an aerodynamic skirt (40) fixedly joined around the perimeter thereof to aerodynamically smoothly blend said radome (32) to said fuselage (14) for reducing aerodynamic drag losses therefrom;
said frame (30) includes a front seat (50a) being sized for mounting said antenna (26);
said radome bulb (34) is spherical above said front seat (50a) for permitting rotation of said antenna (26) during operation;
said anchors (38) being supported by corresponding ones of said seats (50); and
said frame (30) includes a plurality of latches (56) distributed around the perimeter thereof for selectively locking closed said radome (32) atop said frame (30) and unlocking open said radome (32) from said frame (30) pivotally outwardly about said hinge (36,74,78).

\* \* \* \* \*